US008494566B2

(12) United States Patent
Chen et al.

(10) Patent No.: US 8,494,566 B2
(45) Date of Patent: Jul. 23, 2013

(54) HYBRID MOBILE PHONE GEOPOSITIONING

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 12/791,084

(22) Filed: Jun. 1, 2010

(65) Prior Publication Data

US 2011/0294515 A1 Dec. 1, 2011

(51) Int. Cl.
*H04W 24/00* (2009.01)

(52) U.S. Cl.
USPC ..... 455/457; 455/456.1; 455/440; 455/404.2; 370/338

(58) Field of Classification Search
USPC ............ 455/456.1–457, 404.2, 440; 370/331, 370/338
See application file for complete search history.

(56) References Cited

U.S. PATENT DOCUMENTS

| | | | |
|---|---|---|---|
| 2005/0107954 A1* | 5/2005 | Nahla | 701/301 |
| 2005/0213155 A1* | 9/2005 | Ciccarelli | 358/1.18 |
| 2005/0227709 A1* | 10/2005 | Chang et al. | 455/456.1 |
| 2006/0019679 A1* | 1/2006 | Rappaport et al. | 455/456.5 |
| 2006/0046749 A1* | 3/2006 | Pomerantz et al. | 455/457 |
| 2006/0264212 A1* | 11/2006 | Sekhar | 455/432.1 |
| 2007/0004394 A1* | 1/2007 | Chu et al. | 455/422.1 |
| 2007/0167174 A1 | 7/2007 | Halcrow et al. | |
| 2008/0004037 A1* | 1/2008 | Achlioptas et al. | 455/456.1 |
| 2008/0172173 A1* | 7/2008 | Chang et al. | 701/207 |
| 2008/0248811 A1 | 10/2008 | Maloney et al. | |
| 2008/0248813 A1 | 10/2008 | Chatterjee | |
| 2008/0318597 A1* | 12/2008 | Berns et al. | 455/456.5 |
| 2009/0075672 A1 | 3/2009 | Jones et al. | |
| 2009/0280801 A1* | 11/2009 | Malik | 455/426.1 |
| 2009/0312036 A1 | 12/2009 | Alizadeh-Shabdiz | |
| 2009/0326815 A1* | 12/2009 | Williamson et al. | 701/212 |
| 2010/0017525 A1* | 1/2010 | Albert et al. | 709/229 |
| 2010/0039320 A1* | 2/2010 | Boyer et al. | 342/357.09 |
| 2010/0295803 A1* | 11/2010 | Kim et al. | 345/173 |

(Continued)

FOREIGN PATENT DOCUMENTS

| | | |
|---|---|---|
| JP | 2000040990 A | 2/2000 |
| KR | 1020030014114 A | 2/2003 |

(Continued)

OTHER PUBLICATIONS

"International Search Report", Mailed Date: Dec. 21, 2011, Application No. PCT/US2011/037484, Filed Date: May 22, 2011, pp. 11.

(Continued)

*Primary Examiner* — Lester Kincaid
*Assistant Examiner* — Mehmood B Khan
(74) *Attorney, Agent, or Firm* — Turk IP Law, LLC (57) ABSTRACT

A hybrid positioning system for continuously and accurately determining a location of a mobile device is provided. Samples of GPS locations from a pool of mobile devices and accompanying cell tower data, WLAN data, or other comparable network signals are used to construct a dynamic map of particular regions. The dynamic map(s) may be sent to and stored on individual mobile devices such that the mobile device can compare its less accurate, but more readily available, data like cell tower signals to recorded ones and estimate its position more accurately and continuously. The position data may be sent to a server for user in location based services.

18 Claims, 7 Drawing Sheets

U.S. PATENT DOCUMENTS

2011/0032152 A1* 2/2011 Lo et al. .................. 342/450
2011/0040625 A1* 2/2011 Woodruff et al. ......... 705/14.58
2011/0288756 A1* 11/2011 Chapman et al. ............. 701/118

FOREIGN PATENT DOCUMENTS

| KR | 1020040030367 A | 4/2004 |
|---|---|---|
| WO | 2009124349 A1 | 10/2009 |
| WO | 2009142963 A2 | 11/2009 |

OTHER PUBLICATIONS

Cian, et al., "Can hybrid location technologies deliver mass market solutions?", Retrieved at <<http://news.thewherebusiness.com/content/can-hybrid-location-technologies-deliver-mass-market-solutions >>, Apr. 22, 2010, pp. 1-2.

Young, Todd., "Rosum, Siano to debut location-enabled mobile TV chip", Retrieved at <<http://www.gpsbusinessnews.com/Rosum-Siano-to-debut-location-enabled-mobile-TV-chip_a2087.html >>, Mar. 2, 2010, pp. 1-4.

Litchfield, et al., "How to use GPS satellite navigation and Nokia Maps on the Nokia 5800 XpressMusic", Retrieved at <<http://www.allaboutsymbian.com/features/item/How_to_use_GPS_satellite_navigation_and_Nokia_Maps_on_the_Nokia_5800_XpressMusic.php >>, Mar. 26, 2009, pp. 1-14.

Myllymaki, et al., "Location Aggregation from Multiple Sources", Retrieved at <<http://ieeexplore.ieee.org/stamp/stamp.jsp?tp=&arnumber=994393 >>, Proceedings of the Third International Conference on Mobile Data Management, Jan. 8-11, 2002, pp. 8.

* cited by examiner

HYBRID MOBILE PHONE GEOPOSITIONING

BACKGROUND

The recovery of the location of a mobile device, such as a cellular telephone or a smart phone, is the basis for a wide range of Location-Based-Services (LBS). A Location Based Service is an information service, accessible to mobile devices through the cellular network utilizing the geographical position of the mobile device. Location based services can be used in a variety of contexts, such as health, work, personal, and entertainment by identifying the location of an individual or object using the position of the mobile device and providing the individual with information regarding various service providers in the same location as the individual. LBS can include sending advertising directed at customers based on their location, personalized weather services, locations of restaurants, gas stations, other businesses, and comparable services.

Various techniques may be utilized in order to determine the location of a mobile device, including network based cell tower triangulation, Global Positioning System (GPS), peer-based systems (e.g. Bluetooth based short range systems), and Wireless Local Area Networks (WLAN). Network-based techniques, such as cellular triangulation, utilize the service provider's network infrastructure and temporal delay of tower signals from nearby cell towers' receptions to identify the location of a mobile device within a "cell." This method is the most common as it can be implemented cost effectively and non-intrusively while the mobile device is not actively in use by the user. However, the accuracy of this technique is relatively low due to its dependence on the concentration of base station cells, achieving an accuracy of a few tenths of meters in urban areas, but as poor as hundreds of meters in suburban areas and rural zones. Accuracy may also vary due to obstacles such as large buildings and weather conditions.

Using WLANs may apply a similar triangulation method with the WLAN signal origination spot as the basis for the triangulation cell, or more commonly the location can be estimated by sensing a single WLAN source, as the WLAN range is typically limited. This method may be more useful in urban areas, where the relatively large number of WLAN spots may generate smaller cells relative to cell towers and increase positional accuracies. However, WLAN spots must be mapped relative to the world, and their use is dependent on a comprehensive database of WLAN access points. WLAN points maybe very dynamic, and may be added, removed, turned on and off quite frequently. Their accuracy may also be reduced due to obstacles and weather. Another approach using GPS is the most accurate method of locating a mobile device to within 10-30 meters. However, this approach requires substantial computation power and is energy expensive, which may rapidly deplete battery power on a mobile device. As a result, GPS based location determination is commonly used for short intervals or in specific navigation tasks, and is not continuously activated on most mobile devices. GPS is also difficult to be sensed in indoor environments.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a hybrid positioning system for continuously and accurately determining a location of a mobile device. The hybrid positioning system may utilize samples of GPS locations from a pool of mobile devices accompanied by cell tower data, WLAN data, or other comparable network signals to construct a dynamic map of particular regions. According to some embodiments, the dynamic map may be sent to and stored on a mobile device. The map may enable the mobile device to compare its less accurate, but more readily available, data such as cell tower signals to recorded ones and estimate its position more accurately. The position data may be further enhanced by GPS data whenever it is available. The mobile device may then send its position to a server for user in location based services.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, mobile location data may be gathered using mobile devices enabled with Global Positioning Systems (GPS) and their reception of cellular tower signal information or other wireless signal information, such as WLANs, or other comparable systems. Such data may then be used to build a continuous and dynamic map of an area within a cellular network of cellular towers, WLAN origination spots, other wireless signals and their relation to accurate GPS locations. A system according to embodiments may utilize other location detection mechanisms as well. For example, short range signals such as Bluetooth that may mark locations (e.g. stores), location recognition by matching images, taken by an imaging capable device, audio recognition (e.g. the sound of a clock tower, ambient noise, etc. may be compared to sounds in a pre-recorded library), and comparable ones. Any information such as the ones described above may be added to the location map. In addition, an accelerometer and/or a compass integrated into the mobile device may also be used to as a location determination source.

An accurate location of any mobile device within an area or landscape may then be determined using the dynamic map of the landscape and interpolation of points on the map using algorithms and mapping techniques. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device or mobile device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for using signal information and positioning data to generate a dynamic map to locate mobile devices in a geographic area. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below.

Figure 1:
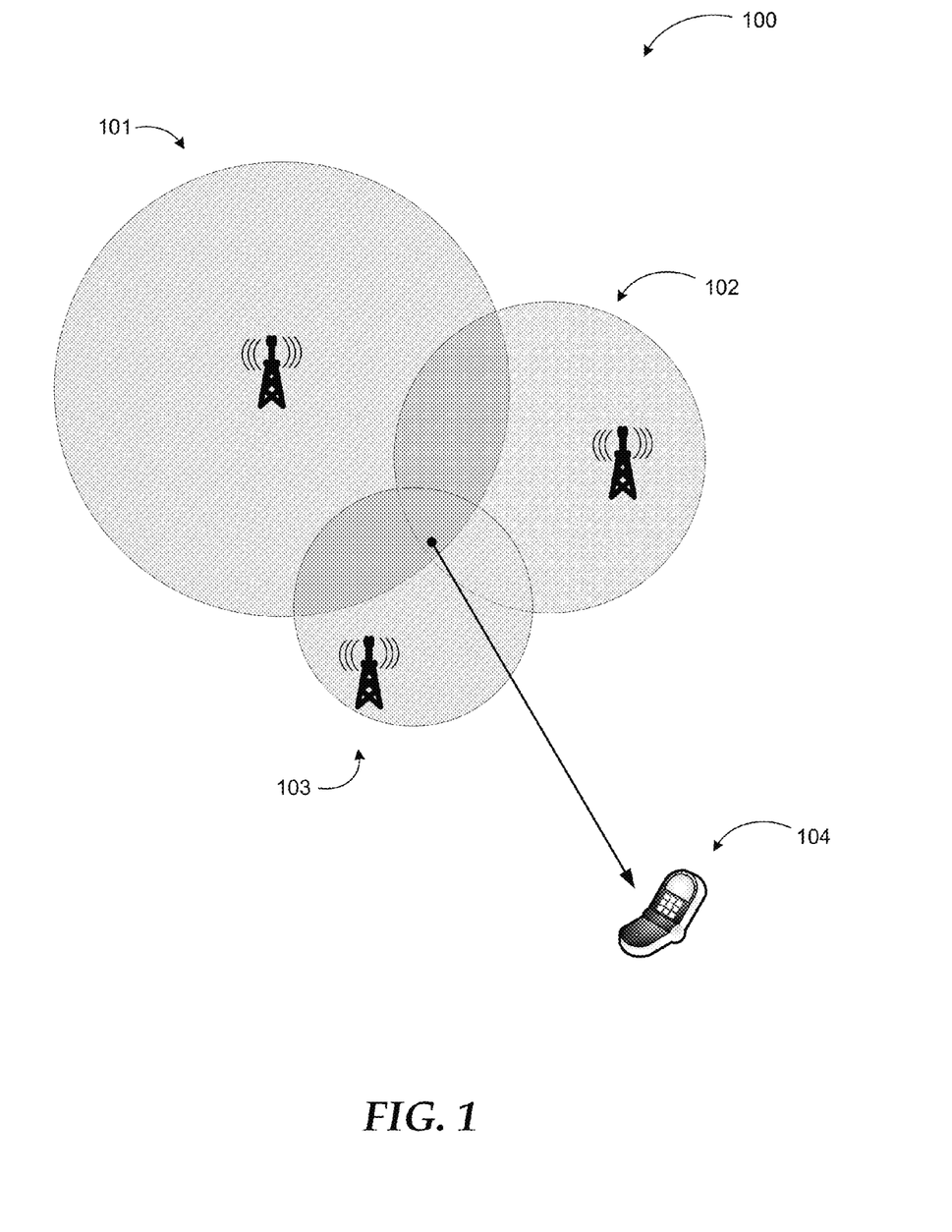
FIG. 1 is a diagram illustrating an example of cellular triangulation technique.

Referring to FIG. 1, diagram 100 illustrates an example cellular triangulation technique for locating a mobile device within a cell. Cellular triangulation uses signal analysis data to calculate the time it takes signals to travel from a mobile device 104 to at least three cellular towers (101, 102, and 103). The first tower 101 detects the mobile device 104 within a certain radius of its signal, and the second tower 102 detects the mobile device 104 within a certain radius of its signal, and the third tower 103 then detects the mobile device 104 within a certain radius of its signal. The area where each radius overlaps is the approximate location of the mobile device. Cellular Triangulation does not take into account obstacles or impedances such as buildings and weather conditions, and the accuracy of the mobile device's location is relatively low. Any platform, network, or computing device may perform the signal analysis, once the mobile device communicates the signal data to the network or computing device.

Triangulation is not limited to cellular towers, but can also be used with other wireless signals such as Wireless Local Area Networks (WLAN), which transmit wireless signals that are received by mobile devices. Mobile devices can then be detected in an area in which the mobile device receives signals from at least three different WLANs or identifiable transmitters (e.g. repeaters) of the same WLAN. Measurement of the signal strength and computation of the triangulated location may be performed at the mobile device or at another device coupled to the network as discussed above.

Figure 2:
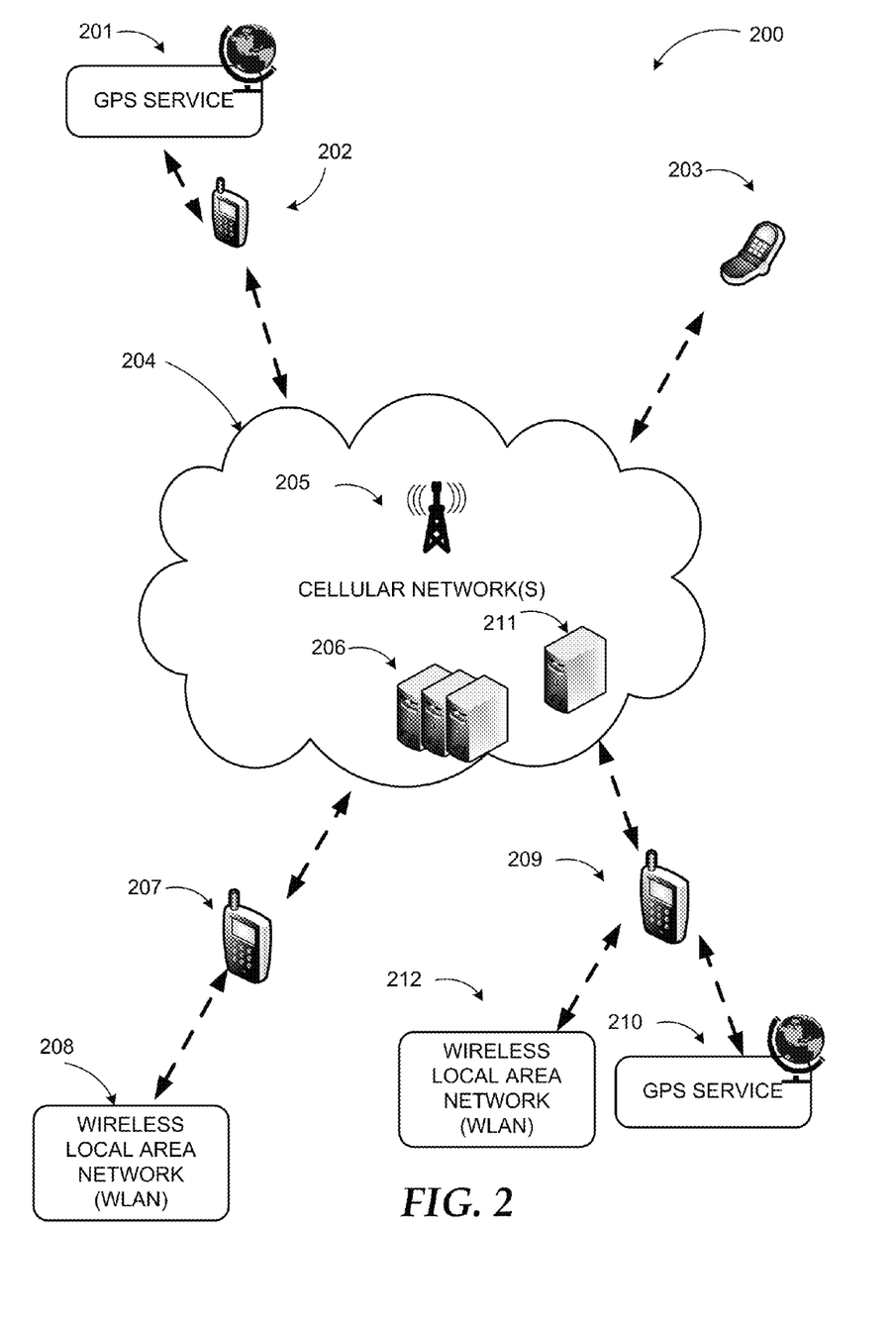
FIG. 2 illustrates an example environment, where various mobile devices employ different signal sources for determining their locations.

In FIG. 2, diagram 200 illustrates an example environment, where various mobile devices employ different signal sources for determining their locations. Of the mobile devices, some may be enabled to connect to GPS and others to WLANs. All mobile devices may be connected to cellular network 204. While the example illustration is focused on cellular network based mobile devices, embodiments are not limited to those. Indeed, embodiments may be implemented with mobile devices that can utilize any one of GPS, WLAN, and cellular network signals to determine their location, as well as various combinations of the three signal sources. Other network types such as Wide Area Networks (WANs) or short range signals from Personal Area Networks (PANs) or similar small networks may also be utilized to estimate mobile device locations using the principles described herein. Furthermore, matching images or audio captured by the mobile devices, integrated position devices such as accelerometers or compasses may be employed to enhance location determination. According to further embodiments, mobile devices may be "tethered". For example, if two acquaintances are near each other, only one may need to run the geo-location application. The other can "tether" their live location.

Mobile device 203 exemplifies the common cellular phone based device in a network, which only senses and receives signals from cellular towers 205. Thus, the local position of such devices can only be determined using techniques such as cellular triangulation. A system according to embodiments relies on comparison of different location determination techniques for increasing accuracy of techniques such as cellular triangulation. Therefore, mobile device 203 may be useful to the data collection portion of the system if it has a secondary method of determining its location (e.g. a stationary device at a known location). On the other hand, mobile device 203 may utilize an output of the system, a dynamic map of location based data points including signal information such as cellular signal values, thereby determining its location accurately based on the cellular signal readings at the device.

Mobile device 202 is an example of a mobile device enabled with a satellite-based positioning system such as a GPS service 201. Mobile devices enabled with GPS may calculate their precise geographic location of the device using the GPS service 201. The GPS service 201 calculates the location by timing signals sent by GPS satellites and communicates the specific position signal to the mobile device 202. Once the mobile device 202 receives an accurate position signal from GPS, the device may store its accurate geographical location. Simultaneously, the mobile device 202 receives signals from the cellular towers 205 and may stores signal strength data from each cellular tower within its range. Mobile device 202 may communicate via cellular network 204 to a hosted service 206 or individual server 211 and send its precise geographical location provided by GPS and the signal strength data from cellular towers for processing.

Mobile device 207 exemplifies a mobile device, which is connected to various cellular towers 205 via cellular network 204 and also receives signals from WLAN 208. Mobile devices enabled to receive WLAN signals 208 can be used to estimate the mobile device's position through similar triangulation techniques or other algorithms where the basis for the triangulation is the WLAN signal location. In addition to triangulation, mobile device 208 may also determine its location based on an identity of WLAN 208 if the network is a relatively small one such as a home network or a hot spot. Once the device receives signal information from WLAN 208, it may communicate this data to the hosted service 206 or server 211, which may use the WLAN based and cellular triangulation based data to create a data point in the dynamic map of locations.

Mobile device 209 is a device enabled with GPS 210 and connected to WLAN 212. Mobile device 209 also receives continuous signals from various cellular towers 205 and is connected to cellular network 204. Mobile device 209 may report to hosted service 206 and/or server 211 signal strength information associated with cellular towers 205, WLAN 212, its GPS based location, and any additional position information signals providing multiple sources of information. The information may then be used to add a data point to a dynamic map of locations and associated signal strengths/types.

Figure 3:
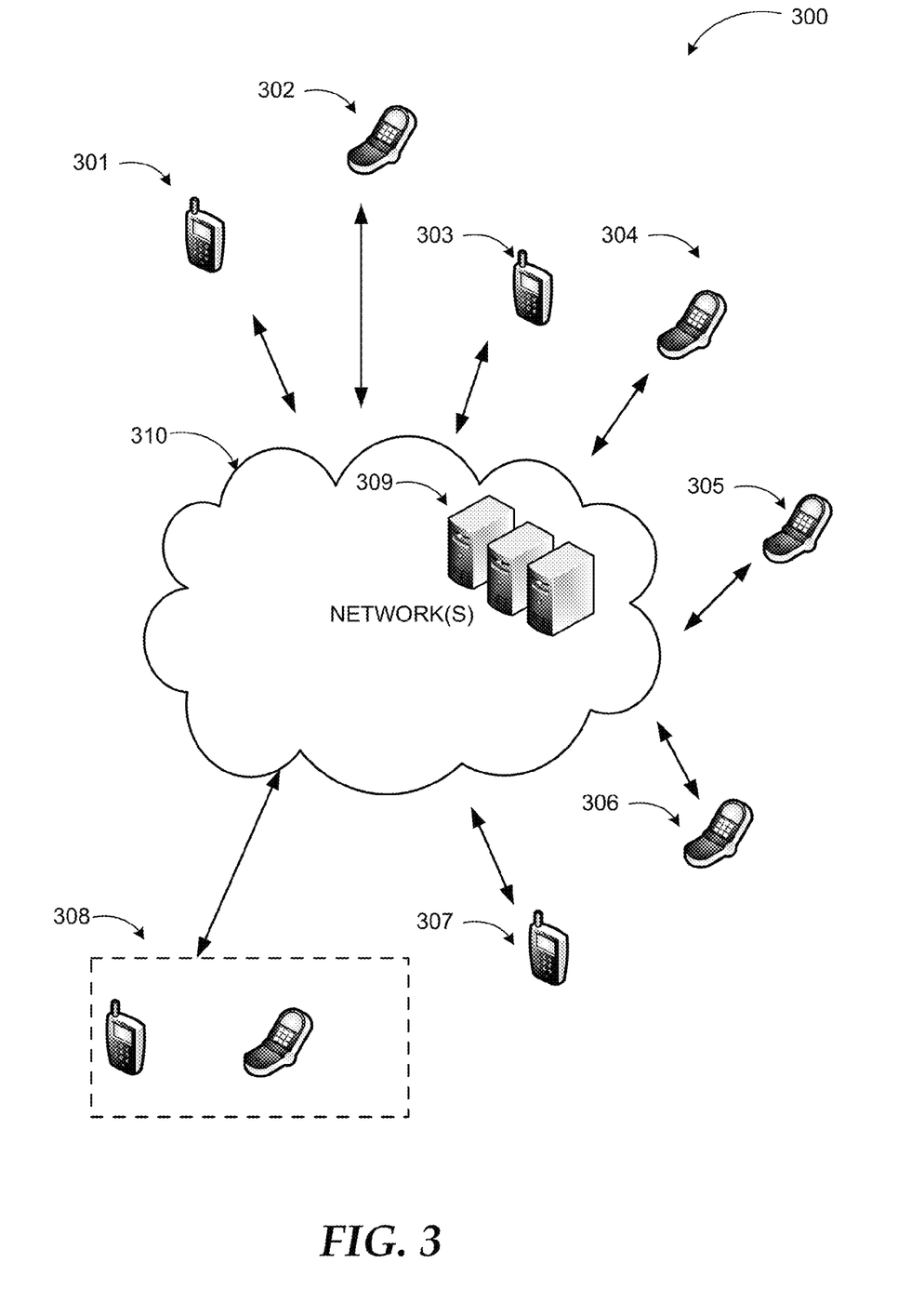
FIG. 3 illustrates a network, where a location determination service may receive data from mobile devices connected to cellular towers, WLANs, and/or GPS.

FIG. 3 illustrates a network, where a location determination service may receive data from mobile devices connected to cellular towers, WLANs, and/or GPS. As discussed above, various mobile devices (301 through 307) may collect and report location information based on different sources. The location information may include longitude/latitude information provided by a GPS service, signal strength and/or identity information associated with cellular or data networks, and comparable ones. Some of the data such as cellular triangulation information may not be as accurate as others, but by correlating data from different sources, an accuracy of location information for each device may be increased.

The information received from mobile devices 301 through 307 at servers 309 via network(s) 310 may be processed to generate a database of locations and corresponding signal strengths/source identities (e.g. WLAN identity, cell tower identity). Then, a dynamic map of locations and corresponding signal strengths/source identities may be created. According to some embodiments, additional data points for the map may be generated by extrapolating data from existing received data.

Servers 309 may transmit the map to mobile devices 308, which may use it to determine their locations accurately and continuously by evaluating signal strengths and source identities against comparable ones on the map. The map may be a dynamic one updated as new information from mobile devices 301 through 307 is collected, new extrapolations performed, and/or old data decays with time (e.g. by weighting). This way, mobile devices 308 do not have to activate and use energy consuming GPS continuously to determine their location accurately. Even if mobile devices 308 do not have GPS capability, they can still determine their location with relatively high accuracy based on cellular or other network signals. According to other embodiments, the location determination process may be further enhanced by sporadic GPS readings in devices equipped with GPS capability (but not continuous use).

The example systems in FIG. 1 through 3 have been described with specific servers, mobile devices, networks, and interactions. Embodiments are not limited to systems according to these example configurations. A network containing various wireless connections and devices for communication may be implemented in configurations employing fewer or additional location measuring components and performing other tasks. Furthermore, specific protocols and/or interfaces may be implemented in a similar manner using the principles described.

Figure 4:
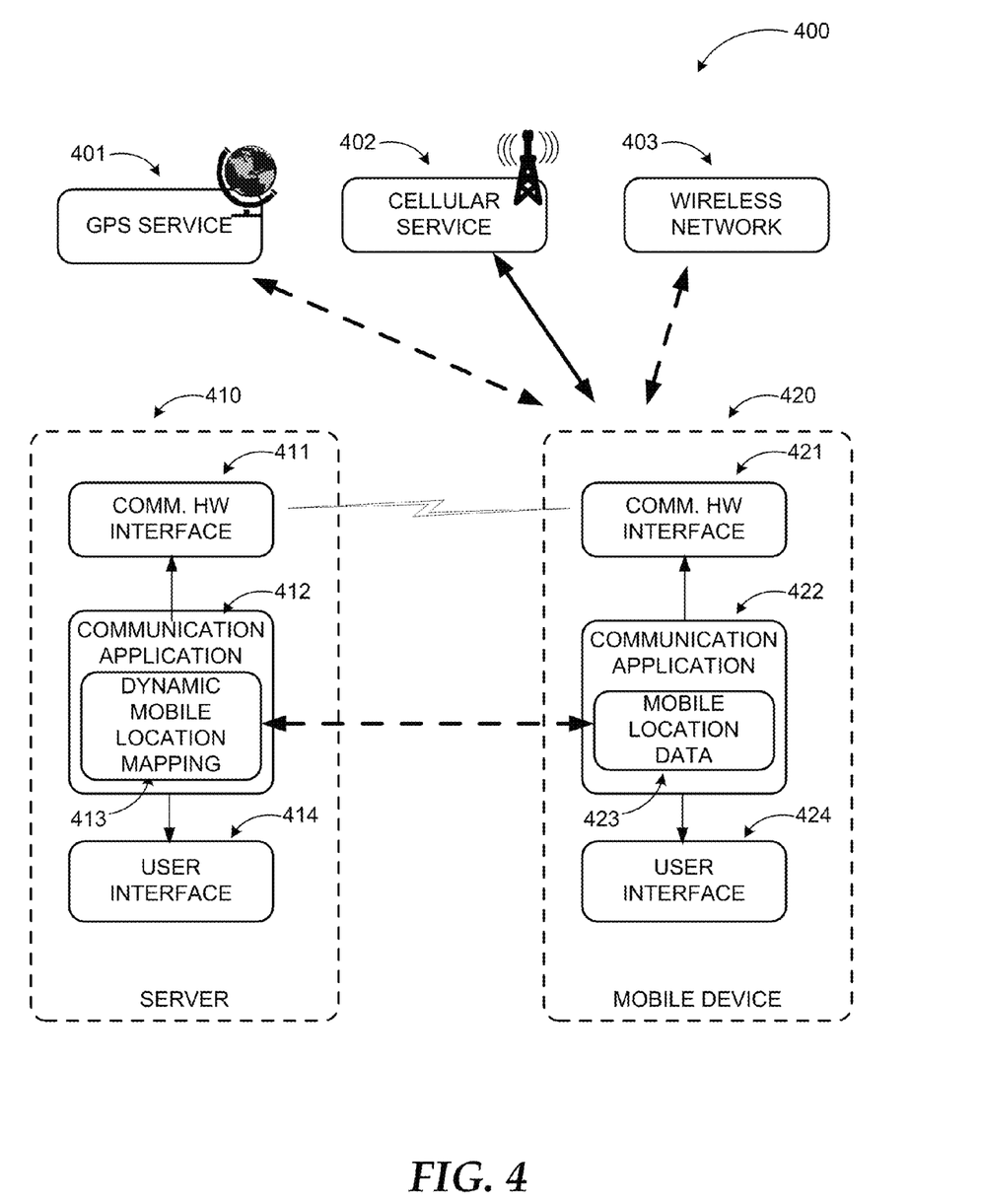
FIG. 4 is a block diagram of an example mobile device operating environment and server computing environment, where network communication and processing of a dynamic map according to embodiments may be implemented.

FIG. 4 is a block diagram of an example mobile device operating environment and server computing environment, where network communication and processing of mobile location data to generate a dynamic map according to embodiments may be implemented. The mobile device operating environment may include a mobile device 420 connected to cellular service 402, GPS service 401, or wireless networks 403, which may interact with the mobile device 420 to provide mobile location data and other services.

Mobile device 420 may include a mobile location data module 423 for obtaining data related to a mobile location or geographical position of the mobile device, such as GPS specific location of the mobile device or the cellular tower signal strength of surrounding cellular towers, or the signal strength of surrounding WLAN spots. The mobile device 420 may continuously gather and store mobile location data and signal strength data and then communicate the mobile location data to server 410 via the cellular network or another wireless network. Because transmitting information can be energy costly, the device may send updates when it has access to an accurate location (e.g. GPS) to update the dynamic map, and occasionally when it does not have access to GPS. A dynamic mobile location mapping module 413 of server 410 may store and process the location data to build a dynamic map of mobile locations.

Mobile device 420 and server 410 may communicate through their respective communication applications 422 and 412 employing communication hardware interfaces 421 and 411. Server 410 may accumulate mobile location data samples to create a map of mobile devices within the area and their GPS positions relative to cellular towers and/or WLANs and signal strengths. As the sampled data points are accumulated by the server 410, dynamic mobile location mapping module 413 may process the samples and add them to the database to generate a continuous mapping and a dynamic view of the cellular landscape. Various operational aspects of server 410 may controlled through its user interface 414.

Server 410 may also provide the dynamic map to mobile device 420 enabling it to compare its signal strength information to the data points on the map and accurately determine its own position even in the absence of accurate location data such as GPS data. To optimize transmission and storage/processing at the mobile device 420, server 410 may compress the map prior to transmission using various compression techniques such as principal component analysis (PCA). Dynamic mobile location mapping module 413 may also interpolate received data points and extrapolate additional data points based on its computations. This approach may be especially useful in regions with few data points (e.g. rural areas with sparse mobile devices) or in regions, where data from cellular networks or WLANs may be skewed due to geographical impediments, weather conditions, etc.

Figure 5:
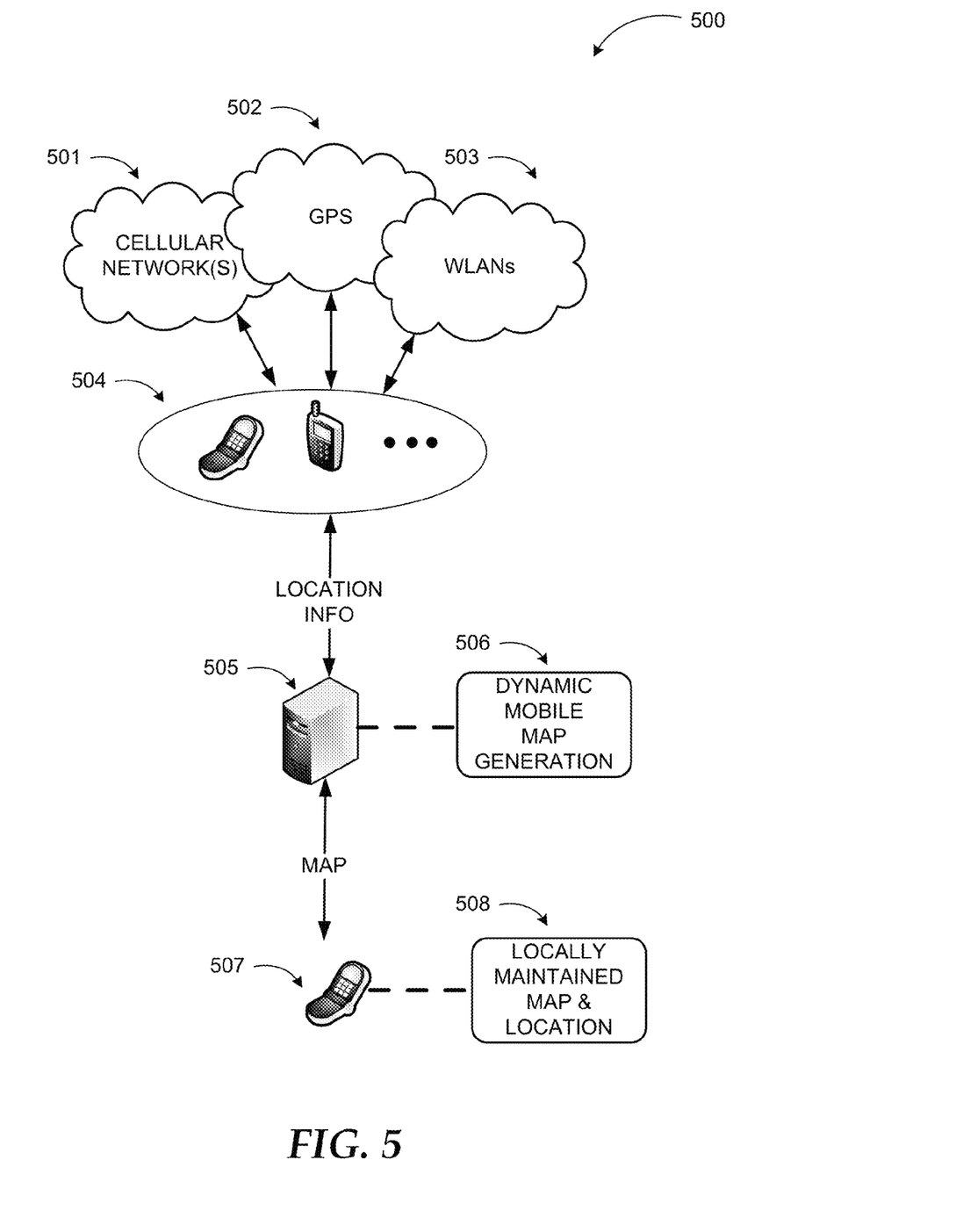
FIG. 5 is a conceptual diagram illustrating use of location information from a plurality of mobile devices in creating a dynamic map to be used for accurate and continuous location determination by other mobile devices.

FIG. 5 includes conceptual diagram 500 illustrating use of location information from a plurality of mobile devices in creating a dynamic map to be used for accurate and continuous location determination by other mobile devices. As discussed previously, a framework for enabling accurate and/or continuous location determination of mobile devices without continuous use of accurate location services such as GPS includes three main components.

The first component includes mobile devices 504, which may receive location information from a variety of sources such as cellular networks 501, GPS service 502, WLANs 503, and comparable ones. Some of the mobile devices 504 may receive location information from a single source while others may receive location information from a combination of two or more sources. Mobile devices 504 may report their location information (i.e. location from GPS, signal strength and source identity from various cell towers, signal strength and source identity from various WLANs and their transmitters in case of WLANs with multiple transmitters) to server 505, which may execute a mapping application that generates a dynamic mobile location map 506. The map may include data points reflecting locations and corresponding signal strength/source identity information for cellular networks and/or WLANs.

The dynamic mobile location map 506 may be transmitted to a mobile device 507, where the locally maintained map 508 may be used to determine the mobile device's location accurately by comparing signal strength/source identity information from cellular networks and/or WLANs. The information detected by the mobile device 507 may be compared to data points and a corresponding location determined. This way, mobile device 507 may determine its location accurately (and continuously) without continuous use of a service like GPS. The locally maintained map 508 may be updated periodically, on demand, or upon changes in the master map at the server 505.

According to some embodiments measures may be taken to protect privacy of mobile device users and/or to protect the cellular network from contamination with malicious input of mobile location data. One such measure may include assigning identifiers to each mobile device in an anonymous manner such that the identity of the device cannot be traced back to its user. The cellular network may then keep a record of the origination of sample points of mobile location data. Input from mobile devices may be weighted based on their "reputation", e.g. past history of providing truthful or reliable location information.

Figure 6:
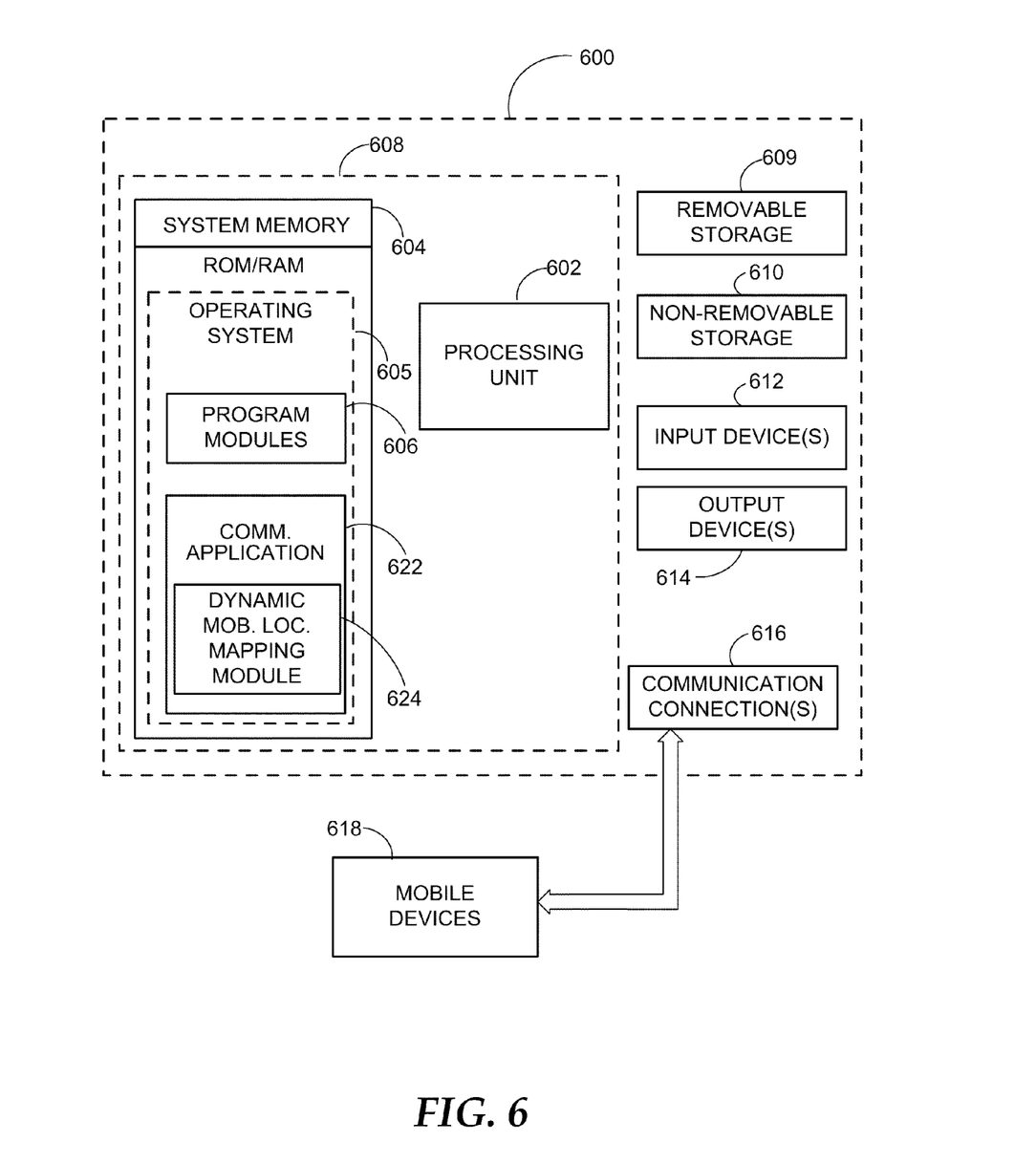
FIG. 6. illustrates an example computing device, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing an application capable of using mobile location data to generate a dynamic mobile location map according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, application 622, and dynamic mobile location mapping module 624.

Application 622 may enable the cellular network to accumulate sample mobile location data from mobile devices 618 users to generate a continuous and dynamic map of mobile location data. Through the dynamic mobile location mapping module 624, a continuous map of mobile devices locations and varying cellular tower signal strengths may be generated in order to provide a map for interpolating the locations of other mobile devices within the cellular network landscape. The dynamic mobile location mapping module 624 may continuously accumulate sample points from multiple mobile devices in the network as they move throughout the network and may dynamically update the data as it receives new samples. Application 622 and dynamic mobile location mapping module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices, such as mobile devices 618 over a wired or wireless network in a distributed computing environment, a satellite link, a cellular link, a short range network, and comparable mechanisms. Mobile devices 618 may include cellular phones, smart phones, vehicle mount mobile devices, handheld computers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
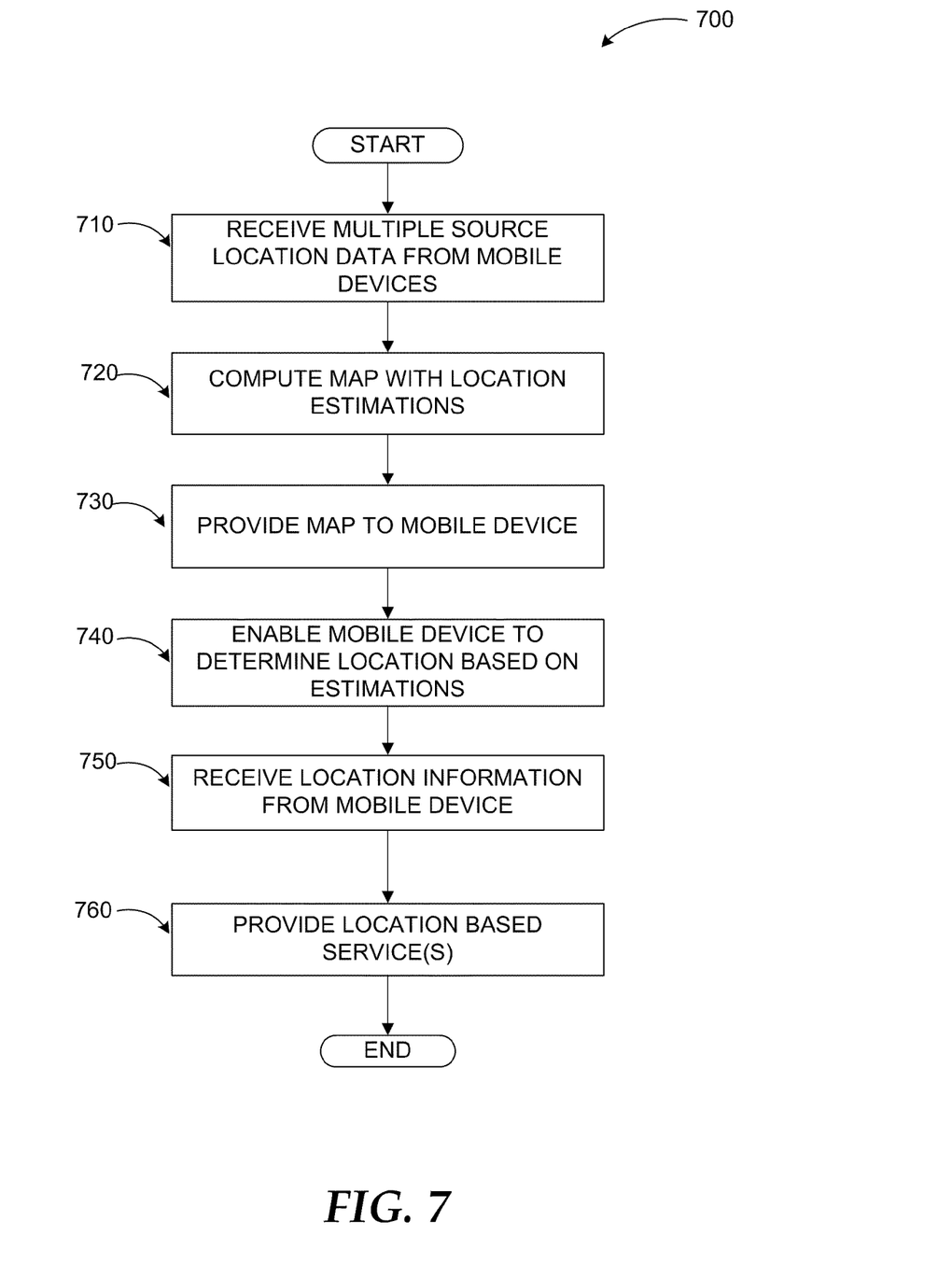
FIG. 7 illustrates a logic flow diagram for a process of using mobile devices to gather mobile location data to generate a dynamic map for accurately and continuously determining locations of other mobile devices.

FIG. 7 illustrates a logic flow diagram for process 700 of using mobile devices to gather mobile location data to generate a dynamic map for accurately and continuously determining locations of other mobile devices. Process 700 may be implemented on a server or other computing device.

Process 700 begins with operation 710, where location data is received from various mobile devices within a cellular network connected to at least one of Global Positioning Systems (GPS), Wireless Local Area Networks (WLAN) or cellular towers. The mobile devices may gather mobile location data from each available source including specific geographical location data from GPS and varying signal strengths/source identities from WLANs and/or cellular towers. At operation 720, a dynamic map may be created based on the received location data. The map may include locations and corresponding signal strength/source identity information. The map may further include extrapolated data points based on received ones.

At operation 730, the map may be provided to a mobile device by the server. For optimization of transmission and storage at the mobile device, the map may be compressed using a variety of compression techniques. At operation 740, the mobile device may be enabled to determine its location by comparing a signal strength and source identity for the signal to one or more corresponding ones on the map allowing the mobile device to determine its location accurately and continuously without having accurate location data such as GPS data. At operation 750, the location information may be received from the mobile device and a location based service provided to the mobile device at optional operation 760 based on the received location information.

The operations included in process 700 are for illustration purposes. Gathering mobile location information, communicating mobile location information, generating mobile location maps and interpreting the maps for location based services may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for determining accurate location of a mobile device, the method comprising:
receiving mobile location data associated with a plurality of mobile devices based on one or more distinct signal types at a communication application, wherein a first mobile device tethered to a second mobile device is configured to transmit the mobile location data for both the first mobile device and the second mobile device;
creating a database of mobile location data by comparing distinct signal types for each location at a dynamic mobile location mapping module executed by the communication application, wherein the dynamic mobile location mapping module is configured to keep a record of origination points of mobile location data in the database and to weight input from the plurality of mobile devices based on a determined accuracy of the input by the plurality of mobile devices;
creating a dynamic map of mobile device locations based on the database within a cellular network region at the dynamic mobile location mapping module;
compressing the map for optimized transmission to a mobile device and optimized storage at the mobile device employing principal component analysis;
transmitting the map to the mobile device;
enabling accurate estimation of the mobile device's location by comparison of at least one of the distinct signal types to a current location signal received by the mobile device at its current location employing the data in the map.

2. The method of claim 1, further comprising:
receiving estimated location data from the mobile device; and
providing a location based service to a user of the mobile device based on the estimated location.

3. The method of claim 1, wherein the distinct signal types include Global Positioning System (GPS) data, cell tower triangulation data, and Wireless Local Area Network (WLAN) location data.

4. The method of claim 1, further comprising:
enabling the plurality of mobile devices to transmit their mobile location data automatically.

5. The method of claim 4, further comprising:
dynamically updating the map; and
transmitting dynamic updates to the mobile device such that a location of the mobile device is continuously determined.

6. The method of claim 1, wherein the estimation of the mobile device's location includes comparison of a cell tower signal strength received at the mobile device to a recorded cell tower signal strength and a corresponding location on the map.

7. The method of claim 6, wherein the estimation of the mobile device's location further includes comparison of a WLAN location data received at the mobile device to a recorded WLAN location data and a corresponding location on the map.

8. The method of claim 1, further comprising:
assigning identifiers to each of the plurality of mobile devices; and
accepting mobile location data from a select group of mobile devices.

9. The method of claim 8, wherein the select group of mobile devices includes mobile devices with a trusted history of providing reliable information.

10. A system for determining accurate location of a mobile device, the system comprising:
a first server configured to:
execute a communication application to receive mobile location data for a plurality of locations based on Global Positioning System (GPS) and at least one of a cell tower triangulation signal and a Wireless Local Area Network (WLAN) signal from a plurality of mobile devices; wherein the mobile location data is received from a first mobile device tethered to a second mobile device among the plurality of mobile devices for both the first mobile device and the second mobile device;
create a dynamic database of mobile location data that includes GPS based data for the plurality of locations and corresponding one of the cell tower triangulation and WLAN signals at a dynamic mobile location mapping module, wherein the dynamic mobile location mapping module is configured to keep a record of origination points of mobile location data in the database and to weight input from the plurality of mobile devices based on a determined accuracy of the input by the plurality of mobile devices;

create a plurality of dynamic maps for distinct regions based on the dynamic database at the dynamic mobile location mapping module;

compress the plurality of dynamic maps for optimized transmission to the mobile device and optimized storage at the mobile device employing principal component analysis;

in response to receiving a GPS based location from a mobile device, transmit a map corresponding to the mobile device's location; and enable continuous estimation of the mobile device's location by comparison of one of the cell tower triangulation and WLAN signals to corresponding data points on the map at the mobile device.

11. The system of claim 10, further comprising:
a second server configured to:
receive the estimated location of the mobile device; and
provide a location based service based on the estimated location.

12. The system of claim 10, wherein cell tower triangulation signals are used when WLAN signals are unavailable.

13. The system of claim 10, wherein the first server is further configured to:
create the map by extrapolating additional data points based on value pairs of GPS locations and one of cell tower triangulation and WLAN signals received from the plurality of mobile devices.

14. The system of claim 13, wherein the additional data points are extrapolated using Radial Based Functions.

15. The system of claim 10, wherein the mobile device is one of: a cellular phone, a smart phone, a handheld computer, and a vehicle mount computer.

16. A computing device for determining accurate location of a mobile device, the computing device comprising:
a memory;
a processor coupled to the memory, the processor executing a communication application in conjunction with instructions stored in the memory, wherein the instructions comprise:

enabling a plurality of mobile devices to collect mobile location data for a plurality of locations based on Global Positioning System (GPS) and at least one of a cell tower triangulation signal, Wireless Local Area Network (WLAN), a Wide Area Network (WAN) and a Personal Area Network (PAN);

receiving the mobile location data from the plurality of mobile devices, wherein the mobile location data is received from a first mobile device tethered to a second mobile device among the plurality of mobile devices for both the first mobile device and the second mobile device;

creating a plurality of dynamic maps of mobile location data for the plurality of locations, wherein the maps include data points of received GPS based locations and corresponding one of the cell tower triangulation and WLAN signals at a dynamic mobile location mapping module;

enhancing the mobile location data for the plurality of locations by one of: matching images and audio captured by the mobile devices, employing accelerometers integrated with the mobile devices, and employing compasses integrated with the mobile devices;

extrapolating additional data points based on value pairs of GPS locations and one of cell tower triangulation and WLAN signals received from the plurality of mobile devices;

compressing the map employing principal component analysis;

transmitting the compressed map to a mobile device; and enabling continuous estimation of the mobile device's location by comparison of one of the cell tower triangulation and WLAN signals to corresponding data points on the map at the mobile device.

17. The computing device of claim 16, wherein the instructions further comprise:
assigning an identifier to each of the plurality of mobile devices for tracking an origination of sample points of mobile location data.

18. The computing device of claim 17, wherein the identifiers are assigned in an anonymous manner such that a privacy of mobile device users is protected.

* * * * *